United States Patent [19]

Ohtsu

[11] Patent Number: 5,167,127
[45] Date of Patent: Dec. 1, 1992

[54] CAR AIR CONDITIONER
[75] Inventor: Eiichi Ohtsu, Ibaraki, Japan
[73] Assignee: Hitachi, Ltd., Tokyo, Japan
[21] Appl. No.: 610,117
[22] Filed: Nov. 7, 1990
[30] Foreign Application Priority Data Nov. 10, 1989 [JP] Japan .................................. 1-291277

[51] Int. Cl.⁵ .............................................. B60H 1/32
[52] U.S. Cl. ...................................... 62/133; 62/228.4
[58] Field of Search ....................... 62/133, 228.5, 126, 62/127, 128, 243

[56] References Cited
U.S. PATENT DOCUMENTS

| 3,710,587 | 1/1973 | Hayashi | 62/230 |
|---|---|---|---|
| 4,432,210 | 2/1984 | Saito | 62/126 |
| 4,488,411 | 12/1984 | Hara | 62/133 |
| 4,688,530 | 8/1987 | Nishikawa et al. | 62/133 X |
| 4,730,520 | 3/1988 | Nishikawa et al. | 62/243 X |
| 4,894,999 | 1/1990 | Kaiju et al. | 62/228.5 |
| 4,898,005 | 2/1990 | Sakurai | 62/115 |
| 4,969,334 | 11/1990 | Goubeaux et al. | 62/133 |

FOREIGN PATENT DOCUMENTS

| 0199536 | 10/1987 | European Pat. Off. . |
|---|---|---|
| 3822465 | 1/1989 | Fed. Rep. of Germany . |
| 6325456 | 7/1961 | Japan . |
| 147908 | 9/1982 | Japan . |
| 175423 | 10/1982 | Japan . |
| 6082427 | 10/1983 | Japan . |
| 136569 | 8/1984 | Japan . |
| 205553 | 11/1984 | Japan . |
| 6328582 | 7/1986 | Japan . |
| 94748 | 5/1987 | Japan . |
| 6449852 | 8/1987 | Japan . |
| 2217876 | 1/1989 | United Kingdom . |

OTHER PUBLICATIONS

European Search Report EP 90 12 1464.

Primary Examiner—William E. Wayner
Attorney, Agent, or Firm—Antonelli, Terry, Stout & Kraus

[57] ABSTRACT

Disclosed is a car air conditioner in which a variable-capacity compressor can be stopped on the basis of judgment as to the failure of a variable capacity mechanism of the compressor to prevent the injury of the compressor when a signal, such as a failure signal, an engine revolution speed signal, or the like, reaches a predetermined value because of the failure. Further disclosed is a car air conditioner in which an uncomfortable feeling caused by the change of the air temperature can be eliminated.

17 Claims, 5 Drawing Sheets

CAR AIR CONDITIONER

BACKGROUND OF THE INVENTION

1. Field of the Invention

The present invention relates to a car air conditioner, and, particularly relates to a controller for use for the car air conditioner.

2. Description of Related Art

There have been various apparatuses used as a conventional backup apparatus at the time of occurrence of a failure in a controller of a car air conditioner one is an apparatus in which a control mode is selected correspondingly to the operating state of an engine as described in Japanese Patent Unexamined Publication No. Sho-57-147908; another is an apparatus in which a failure judging means is provided in a controller to make it possible to open a bypass valve upon occurrence of a failure as described in Japanese Utility Model Unexamined Publication No. Sho-59-136569; another is an apparatus in which an electromotive clutch is switched off upon the occurrence of high-speed rotation of the engine to stop a compressor or to operate the compressor with the capacity reduced or to limit the compressor to a small-capacity side as described in Japanese Patent Unexamined Publication No. Sho-59-205553; another is an apparatus in which the capacity of a compressor is reduced when the engine revolution speed is not more than a predetermined value as described in Japanese Patent Unexamined Publication No. Sho-57-175423; another is an apparatus in which the capacity of a compressor is controlled on the basis of two values of the air temperature just after the passage through an evaporator and the necessary blowout temperature as described in Japanese Patent Unexamined Publication No. Sho-62-94748; and so on.

There has been various conventional apparatuses for preventing the change of the temperature of air in a downstream side of an evaporator. One is an apparatus in which the operating mode of a compressor is switched to minimize the fuel cost in response to an engine revolution speed detection signal and an idle detection signal as signals indicating the state of the car as described in Japanese Patent Unexamined Publication No. Sho-60-82427; another is an apparatus in which the capacity of a compressor is changed by detecting the change of the condenser temperature as well as the change of the evaporator temperature as a state of the cooler cycle as described in Japanese Patent Unexamined Publication No. Sho-63-25456; another is an apparatus in which a capacity control constant is switched on the basis of information as to whether the evaporator downstream air temperature is in an allowable temperature range including its target value as described in Japanese Patent Unexamined Publication No. Sho-64-49852; another is an apparatus in which the capacity control rate is reduced in the case where hunting occurs in the capacity control rate of a compressor at the time of stabilizing the operating state as described in Japanese Patent Unexamined Publication No. Sho-63-285282.

The conventional technique as described in the Japanese Patent Unexamined Publication No. Sho-57-147908 and the Japanese Utility Model Unexamined Publication No. Sho-59-136569 does not consider minimizing the influence of a blowout air temperature and the like on persons riding in the car when the engine revolution speed signal or the air temperature signal just after the passage through the evaporator is stopped because of breaking of wires or the like or when the capacity of the compressor is fixed at its maximum because of a failure of the capacity controller. Accordingly, a problem arises in that the performance of the conventional apparatus using a fixed-capacity-type compressor is deteriorated upon occurrence of a failure.

In the conventional technique as described in the Japanese Patent Unexamined Publication No. Sho-57-147908, there is no consideration of sending signals to external devices to ask for assistance of the external devices. In the conventional technique as described in the Japanese Utility Model Unexamined Publication No. Sho-59-136569, there is no consideration of a backup upon a failure of the controller. Accordingly, is a problem in that the compressor with a large capacity is continuously operated upon occurrence of a failure of the controller so that the evaporator is frozen making ventilation impossible.

In the conventional technique as described in the Japanese Patent Unexamined Publication No. Sho-60-82427, the evaporator downstream air temperature is changed by the change of the state of the car. Accordingly, a problem arises in that an uncomfortable feeling results from the change of the air temperature. In the conventional technique as described in the Japanese Patent Unexamined Publication No. Sho-63-25456, the temperature is changed by the change of the state of the cooler cycle. Accordingly, a problem arises in that an uncomfortable feeling results from the change of the air temperature.

In the conventional technique as described in the Japanese Patent Unexamined Publication No. Sho-64-49852, the response time constant and the like of the cooler cycle is changed with the state of the cooler cycle such as the outside air temperature. Accordingly, the hunting of the evaporator downstream air temperature cannot be reduced sufficiently. Accordingly, a problem arises in that an uncomfortable feeling results from the change of the air temperature. Further, in the conventional technique as described in the Japanese Patent Unexamined Publication No. Sho-63-285286, the evaporator downstream air temperature is changed correspondingly to the hunting when the hunting occurs in the capacity control rate of the compressor. Accordingly, a problem arises in that an uncomfortable feeling results from the change of the air temperature.

SUMMARY OF THE INVENTION

A first object of the present invention is to provide a car air conditioner in which performance which is not inferior to that of a fixed-capacity-type compressor can be maintained though a failure which occurs in the car air conditioner using a variable-capacity-type compressor, or in other words, even if a failure occurs in the communication between a discharged-air thermosensor in an evaporation and a control circuit performance is maintained.

A second object of the present invention is to provide a car air conditioner in which the freezing of the evaporator can be prevented even though a failure occurs in the communication line between the thermosensor and the control circuit.

A third object of the present invention is to provide a car air conditioner in which an uncomfortable feeling caused by the change of air temperature can be eliminated by controlling the evaporator downstream air temperature to maintain a comfortable temperature even though cooler cycle conditions such as the outside air temperature and the gear ratio in a transmission are changed.

To attain the first object, in the car air conditioner according to the present invention, a judgment is made as to whether some failure had occurred in the variable capacity mechanism of the variable-capacity-type compressor the compressor is stopped only when the logical product of a signal of failure and an engine revolution speed signal having a value not less than a predetermined value exhibits logical truth.

Further, means for judging a failure of the engine revolution speed signal is provided so that the engine revolution speed signal can be replaced by the maximum revolution speed when a failure occurs.

Further, a judgment is made as to whether the heat load of the evaporator is more than a predetermined value, so that the compressor can be stopped or the capacity of the compressor can be fixed to a set value only when the logical product of the heat load judgment signal and the engine revolution speed signal having a value not less than a predetermined value exhibits logical truth.

To attain the second object, in the car air conditioner according to the present invention, a judgment is made as to whether a failure occurs in input signals and the like, so that values of the discharged-air temperature, the outside air temperature, the inside air temperature and the like are replaced by set values when a decision has been made that the failure occurred in the input signals and the like.

Further, means for judging a failure of the evaporator downstream air temperature detection signal is provided so that the refrigerant evaporating pressure is controlled to a freezing limit value on the basis of a control signal for determining the refrigerant evaporating rate of the compressor.

To attain the third object, in the car air conditioner according to the present invention, calculation constants for determining the capacity control rate of the compressor are selected corresponding to the target value of the evaporator downstream air temperature, the engine revolution speed and the outside air temperature, so that the capacity of the compressor can be controlled on the basis of the difference between the measured value and the target value of the evaporator downstream air temperature. Further, the constants can be changed on the basis of the difference between the measured value and the target value of the evaporator downstream air temperature.

Further, the capacity control rate of the compressor is corrected on the basis of the change of the outside air temperature in suction air of the air conditioner and the change of the inside air temperature, correspondingly to the change of the state in the cooler cycle.

Further, the capacity control rate of the compressor is corrected on the basis of the change of the gear ratio in the transmission of the car.

In general, when a variable-capacity-type compressor with its maximum capacity is rotated at a high speed, the compressor may be damaged because of the unbalance of the rotating substance. Therefore, it is necessary to reduce the capacity of the compressor or to stop the compressor during high-speed rotation.

The compressor is stopped when both of the two conditions which are that the failure has been judged to occur in the variable capacity mechanism of the compressor and the engine revolution speed signal is not less than a predetermined value are established. Accordingly, the damage to the compressor can be prevented. Furthermore, when one of the two conditions has not established, a good cooling operation as in a fixed-capacity-type compressor can be made.

Further, when the means of judging the failure of the engine revolution speed signal detects the failure, the engine revolution speed signal is set to its maximum revolution speed. Accordingly, if the failure occurs at the time of high-speed rotation, the compressor is stopped to prevent the damage thereof. On the contrary, in the case where no failure occurs even at the time of high-speed rotation, the cooling operation can be continued.

Further, the compressor is stopped when both of the two conditions which are that the heat load of the evaporator is judged to be not less than a predetermined value and that the engine revolution speed signal is not less than a predetermined value are established. Accordingly, the damage to the compressor caused by the high-speed rotation of the compressor with its large capacity can be prevented.

Further, the cooling operation as in a fixed-capacity-type compressor can be maintained by setting the capacity of the compressor to a constant value.

Further, when a failure diagnosis makes a decision that the failure has occurred in input signals and the like, the values of the discharged-air temperature, the outside air temperature, the inside air temperature and the like are replaced by set values. Accordingly, the freezing of the evaporator can be prevented so that the evaporator downstream air temperature can be controlled to a target value.

Further, when some failure is judged to occur in the evaporator downstream air temperature detection signal, the refrigerant evaporating rate is controlled so that the evaporator downstream air temperature is held below a freezing limit. Accordingly, the freezing of the evaporator can be prevented even though a failure occurred in the thermosensor.

The circumstances of the cooler cycle can be found through the target value of the evaporator downstream air temperature, the engine revolution speed and the outside air temperature, so that the capacity of the compressor can be controlled on the basis of constants optimized correspondingly to the circumstances. Accordingly, the downstream air temperature can be controlled stably to a target value, so that blowout air having a comfortable temperature can be obtained.

Further, the overshooting rate of setting time can be obtained by the difference between the measured value and the target value of the evaporator downstream air temperature, so that constants for determining the capacity control rate of the compressor can be corrected. Accordingly, the downstream air temperature can be controlled stably to a target value, so that blowout air having a comfortable temperature can be obtained.

The capacity control rate of the compressor is corrected for a predetermined time before the evaporator downstream air temperature is changed temporaily by the change of the heat load of the evaporator caused by the change of suction air in the air conditioner. Accordingly, the change of the downstream air temperature can be prevented, so that blowout air having a comfortable temperature can be maintained.

The capacity control rate is corrected for a predetermined time before the evaporator downstream air temperature is changed temporarily by a lagging response of the variable capacity mechanism caused by the sudden change of the compressor revolution speed in turned caused by the change of the gear ratio in the transmission. Accordingly, the change of the downstream air temperature can be prevented, so that blowout air having a comfortable temperature can be maintained.

DESCRIPTION OF THE PREFERRED EMBODIMENTS

An embodiment of the present invention will be described blow with reference to FIGS. 1 through 6.

Figure 1:
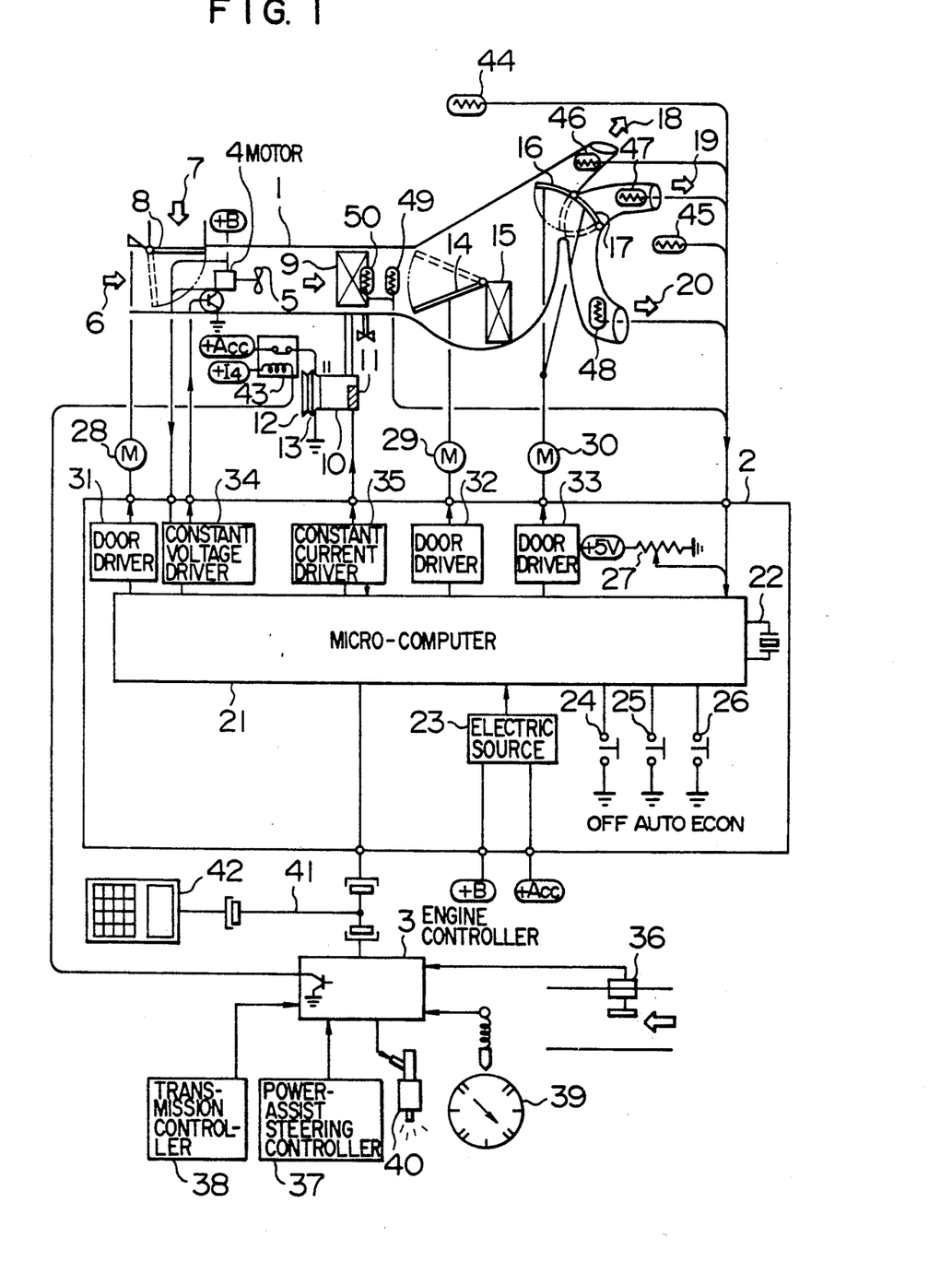
FIG. 1 is a system configuration diagram of a car air conditioner as an embodiment of the present invention.

FIG. 1 is a system configuration diagram of a car air conditioner as an embodiment of the present invention. The air conditioner comprises a thermoregulator section 1, a control circuit section 2, and an engine controller 3. The thermoregulator section 1, the control circuit section 2 and the engine controller 3 communicate with one another through communication lines.

The thermoregulator section 1 is composed of a fan 5 driven by a motor 4 provided in a duct, an inside air intake 6 for taking in inside air of an air-conditioned room, an outside air intake 7 for taking in outside air, an intake door for switching between the inside air intake 6 and the outside air intake 7, an evaporator 9 for refrigerating the air taken in, an air mixing door 14 arranged in a downstream side of the evaporator 9, a heater 15, a defroster door 16 for controlling air to be blown into the air-conditioned room, a vent door 17, a defroster blowout duct 18, a vent blowout duct 19, a floor blowout duct 20, and a refrigerator including the evaporator 9.

The intake door 8, the air mixing door 14, and the defroster door 16 and vent door 17 are driven by electromotive actuators 28, 29, and 30, respectively.

Thermosensors represented by the reference numerals 44 to 50 and a temperature setting variable resistor 27 are provided in an air-blowout portion.

The refrigerator is composed of a compressor 10, a condenser (not shown) mounted in the neighbor of a radiator, an expansion valve (not shown), and the evaporator 9. For example, the compressor 10 may be constituted by a variable-capacity inclined-plate compressor. In the compressor of this type, the capacity of the compressor is controlled by controlling the inclination angle of the inclined plate through a control valve 11 contained in the compressor. The compressor 10 is rotated by a pulley 12 through an engine and a V belt and is intermittently operated through a magnet clutch 13.

Air controlled by the intake door 8 and taken in is cooled through the evaporator 9. The cooling power of the compressor 9 is adjusted by controlling the rotation speed of the compressor, the expansion valve, an electric current supplied to the control valve 11 contained in the compressor 10, and the like. The air which has passed through the evaporator 9 is separated by the air mixing door 14 into two parts, namely, air bypassing the heater 15 as cooled air and air passing through the heater 15 as suitably heated air.

The air suitably heated by the heater is injected into a car room from a blowout duct selected by the control circuit section 2 from the defroster blowout duct 18, the vent blowout duct 19 and the floor blowout duct 20 on the basis of the positions of the defroster door 16 and the vent door 17.

The number of combinations of the blowout ducts is three. In short, one combination is selected from three combinations, namely, a vent mode (hereinafter referred to as "VENT") in which air is blown out of the vent blowout duct, a bi-level mode (hereinafter referred to as "B/L") in which air is blown out of the vent blowout duct 19 and the floor blowout duct 20, and a floor mode (hereinafter referred to as "FLOOR") in which air is blown out of the defroster blowout duct 18 and the floor blowout duct 20.

The engine controller 3 calculates the quantity of suction air on the basis of the output signal of an air flowmeter 36 provided in a suction pipe in the engine to thereby find the quantity of basic injection ($T_p$) to be supplied to the engine. The quantity of fuel injection is determined by correcting the quantity of basic injection on the basis of a correction value $C_O$ determined from signals obtained by a power-assist steering controller 37, a transmission controller 38 (hereinafter referred to as "AT controller"), an engine revolution speed sensor 39 and the like. As a result, the fuel injection time of an injector 40 for supplying fuel to the engine is controlled.

Further, the engine controller 3 controls an air-conditioning relay 43 for supplying a source voltage to the magnetic clutch 13 for intermittently operating the compressor 10. The air-conditioning relay 43 is controlled to an ON state in the case where the engine controller 3 is normally communicated with the control circuit section 2 and receives an ON instruction from the control circuit section 2.

In the aforementioned configuration, a failure of the air-conditioning controller 2 can be detected even if the communication between the air-conditioning controller 2 and the engine controller 3 is abnormal. Accordingly, the magnet clutch 13 can be switched off when a failure of the air-conditioning controller 2 is detected. This prevents the freezing of the evaporator.

Further, the engine controller 3 and the control circuit section 2 are connected to each other by an SCI terminal so that information, such as the necessary blowout temperature, the sensor temperature, and the like, can be exchanged in the form of binary data. A failure diagnosis device 42 for receiving output signals of respective devices and for indicating the output signals may be connected to a communication line 41 for exchanging information.

In the aforementioned configuration, a failure of the air-conditioning controller can be monitored by an external device. Accordingly, the freezing of the evaporation caused by the operation of the compressor of a large capacity for a long period of time can be prevented, and, accordingly, the stoppage of ventilation in the room can be prevented.

The engine controller 3 controls the engine so that the revolution speed at the time of idling increases as the necessary blowout temperature $T_{conf}$ to the car room falls, in the case where the transmission range is in the position of parking "P" or neutral "N".

By the aforementioned method, shortage of cooling power can be replenished.

In the following, the control circuit section 2 is described. The control circuit section 2 includes a micro computer 21 for performing arithmetic operations, judgments and the like for the purpose of control. In this embodiment, the micro computer 21 includes a central processing unit (hereinafter abbreviated to "CPU"), a read-only memory (hereinafter abbreviated to "ROM") for storing procedures (programs, constants), a random-access memory (hereinafter abbreviated to "RAM"), an input-outout terminal (hereinafter abbreviated to "I/0"), an analog-to-digital conversion input terminal (hereinafter abbreviated to "A/D"), an arbitrary pulsewidth modulation output terminal (hereinafter abbreviated to "PWM"), and a serial communication input-output terminal (hereinafter abbreviated to "SCI terminal").

A quartz resonator 22 with the frequency of 1 MHz as a constituent member of an oscillator for deciding a basic cycle is connected to the micro computer 21. An electric source composed of a battery source (represented by +B) always supplied from a battery not shown, and an accessory source (represented by +Acc) supplied when a key switch not shown is in an "Acc" or "ON" state. The electric source is connected to the micro computer 21 through an electric source circuit 23. The electric source circuit 23 includes a constant-voltage element to generate a constant voltage of 5 V and supply the voltage to the micro computer 21 and its peripheral circuits.

The control circuit section 2 is connected to the engine controller 3 through the SCI terminal as described above and also connected to the thermoregulating section 1 as follows.

The thermosensors represented by the reference numerals 44 through 50, that is, an outside air thermosensor 44, an inside air thermosensor 45 for detecting the temperature of the inside of the air-conditioned room, a defroster duct thermosensor 46, a vent duct thermosensor 47, a floor duct thermosensor 48, an evaporator discharged-air thermosensor 49 and an evaporator refrigerant thermosensor 50, are connected to the micro computer 21 through an A/D converter. Further, the temperature setting variable resistor 27 is connected in the same manner as described above. Electric signals from those sensors are converted into digital binary data and then sent to the micro computer 21 individually.

On the other hand, the intake door 8, the air mixing door 14 and the deaf door 16 and the vent door 17 are driven by the electromotive actuators 28, 29 and 30, respectively. The electromotive actuators 28, 29 and 30 are operated through a driving IC and door driving circuits 31, 32 and 33 according to the instruction of the micro computer 21.

A constant-voltage driving circuit 34 performs feedback control to correct the voltage applied to the motor 4 to a voltage instructed by the micro computer 21. Further, a constant-current driving circuit 35 performs feedback control to correct the current passed through a coil of the control valve 11 to a current instructed by the micro computer 21.

A switch group provided in the outside of the air conditioner to instruct the operation of the air conditioner from the outside, that is, provided in the inside of (1) the air-conditioned room, is composed of an "OFF" switch 24 for instructing stopping, (2) an "AUTO", switch 25 for instructing maximum drying, and (3) an "ECON" switch 26 for instructing economical operation.

The contents of a control program stored in the ROM of the micro computer 21 in the car air conditioner constructed as described above are described with reference to the control flow shown in FIGS. 2 through 5.

Figure 2:
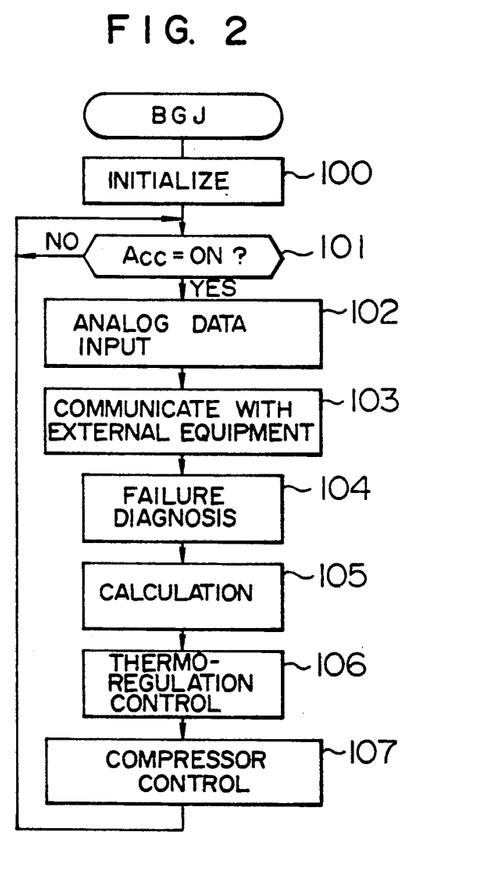
FIGS. 2 through 5 are flow charts of a program stored in a memory in a micro computer depicted in FIG. 1.
Figure 3:
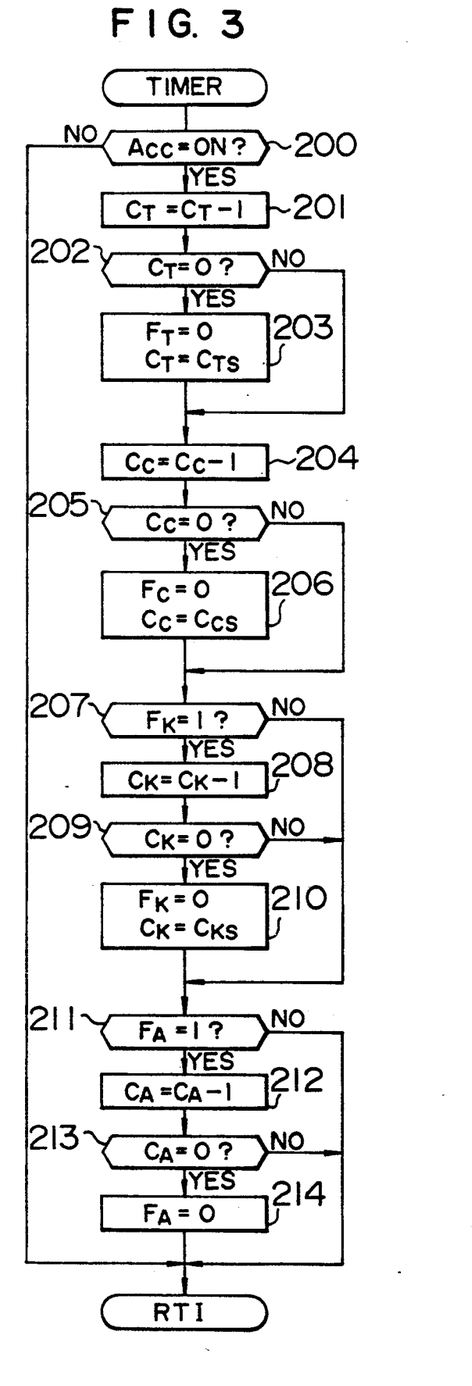

The program is mainly separated into a background job routine (hereinafter referred to as "BGJ") as shown in FIG. 2 and a timer routine (hereinafter referred to "TIMER") as shown in FIG. 3. The BGJ routine is repeatedly executed with a period of about 100 msec. The TIMER routine is repeatedly executed with a period of 5 msec.

The BGJ routine starts from an initializing step (100) whenever the Acc electric source is turned on. The TIMER routine is executed at intervals of a predetermined time (in this embodiment, 5 msec) while the BGJ routine is interrupted by using the time interrupt function of the micro computer 21. When the TIMER routine is finished, that is, when an RII command is executed, the BGJ routine restarts at an interrupt point.

In the initializing step (100) of the BGJ routine, output terminals of I/0 of the micro computer 21 are set to stop the external equipment; flags $F_T$, $F_C$, $F_X$ and $F_A$ stored in the RAM are cleared to "0"; and counters $C_T$, $C_C$, $C_K$ and $C_A$ for storing the number of executions are reset to initial values $C_{TS}$, $C_{CS}$, $C_{KS}$ and "0", respectively. When the B electric source is supplied initially, the initial value of a coefficient $K_{int}$ is written in the RAM. In short, before the control starts, the micro computer 21 is initialized.

A judgment is made as to whether the Acc electric source is in an ON state. When the Acc electric source is not in the ON state, the step 101 is repeated.

After the initialization, the BGJ routine and the TIMER routine are executed. The TIMER routine is now described.

The TIMER routine is executed at intervals of a predetermined time (in this embodiment, 5 msec) while the BGJ routine is executed repeatedly.

In the flow chart shown in FIG. 3, a judgment (Step 200) is made as to whether the Acc electric source is in an ON state. When the Acc electric source is not in the ON state, the routine is terminated with no execution. When the Acc electric source is in the ON state, on the contrary, the counter $C_T$ for controlling the air mixing door 14, which has been initialized in the initializing step 100, is counted down (step 201). Then, a judgment (Step 202) is made as to whether the counter $C_T$ is zero, that is, as to whether a predetermined time has passed. When the result of the judgment is YES, the flag $F_T$ is cleared to "0" to permit controlling of the air mixing door 14 and, at the same time, the counter $C_T$ is reset to an initial value $C_{TS}$ (in this embodiment, "2000" corresponding to 10 sec) for setting a time interval (Step 203).

Then, the counter $C_C$ for controlling the compressor 10, which has been initialized in the initializing step (100), is counted down (Step 204). A judgment (Step 205) is made as to whether the counter $C_C$ is reset to "0", that is, as to whether a predetermined time has passed. When the result of the judgment is YES, the flag $F_C$ is cleared to "0" to permit controlling of the compressor 10, and, at the same time, the counter $C_C$ is reset to an initial value $C_{CS}$ (in this embodiment, "3000" corresponding to 15 sec) for setting a time interval (Step 206).

In the next step 207, a judgment is made as to whether the flag $F_K$ related to magnet clutch control is "1" or not. When the result of the judgment is YES, the counter $C_K$ is counted down (Step 208). Then, a judgment (Step 209) is made as to whether the counter $C_K$ is "0", that is, as to whether a predetermined time has passed. Thereafter, the flag $F_K$ is cleared to "0", and, at the same time, the counter $C_K$ is reset to an initial value $C_{KS}$ (in this embodiment, "600" corresponding to 3 sec) (Step 210).

In the next step 211, a judgment is made as to whether the driving circuit 32 for driving the air mixing door 14 is in an ON state, that is, as to whether the flag $F_A$ is "1". When the result of the judgment is YES, the counter $C_A$ is counted down (Step 212). Then, a judgment (Step 213) is made as to whether the counter $C_A$ is "0", that is, as to whether a predetermined time has passed. Thereafter, the flag $F_A$ is cleared to "0" and the instruction that the air mixing door 14 should turn is stopped (Step 214).

As described above, the TIMER routine measures the time interval for giving instructions to control the air mixing door 14, the compressor 10, the magnet clutch 13 and the driving circuit 32.

In the BGJ routine, failure diagnosis, thermoregulation and compressor control based on the TIMER routine are mainly carried out as follows.

When the initializing step 100 is finished, a judgment (Step 101) is made as to whether the Acc electric source is in an ON state. When the Acc electric source is not in the ON state, the step 101 is repeated.

When the Acc electric source is in the ON state, on the contrary, the respective signal voltages of the outside air thermosensor 44, the inside air thermosensor 45, the defroster duct thermosensor 46, the vent duct thermosensor 47, the floor duct thermosensor 48, the evaporator discharged-air thermosensor 49, the evaporator refrigerant thermosensor 50 and the temperature setting variable resistor 27 are converted into digital signals and then sent to the micro computer 21 (Step 102). Then, the outside air temperature $T_a$, the inside air temperature $T_r$, the defroster duct temperature $T_{dd}$, the vent duct temperature $T_{dr}$, the floor duct temperature $T_{df}$, the discharged-air temperature $T_{int}$, the refrigerant temperature $T_{ref}$ and the set temperature $T_s$ are calculated on the basis of a signal-to-temperature conversion map stored in the ROM of the micro computer 21.

Communication with external equipment such as an engine controller 3 is made through the SCI terminal on the basis of the aforementioned data (Step 103). Examples of the output information are the necessary blowout temperature $T_{conf}$, the information pertaining to a failure of sensors and control valves, and information pertaining to the operating state thereof. On the other hand, examples of the input information are the engine revolution speed $N_c$, the transmission range, and the operating state of auxiliary equipment such as a power assist steering (Step 103). When the auxiliary equipment such as a power assist steering is operated, the ON state of the magnet clutch 13 is limited, that is, the flag $F_K$ is set to "1".

In the failure diagnosis (Step 104), a judgment is made as to whether the input signal has a value at the time of the breaking of wires (or short circuit), that is, as to whether the input signal is abnormal. If there are some failures, numerical values are replaced as follows. Optimum replacing numerical values are different by air-conditioning systems. In this embodiment, replacements as represented by $T_{ref}=0(°C.)$, $T_{int}=T_{ref}-2$ (deg), $T_r=25(°C.)$, $T_a=20(°C.)$, and $N_c=9000$ (rpm) are made.

If there, is no failure, on the contrary, the deviation $\Delta T_r$ of the inside air temperature $T_r$ and the set temperature $T_s$ is calculated as follows.

$$\Delta T_r = T_s - T_r \ldots \quad (1)$$

The necessary blowout temperature $T_{conf}$ is calculated as follows (Step 105).

$$T_{conf} = 2(T_s - 25) + 2.5\Delta T_r - 0.7T_a + 35 \ldots \quad (2)$$

By performing the aforementioned failure diagnosis (Step 104), the freezing of the evaporator 9 can be prevented even in the case where some failure occurs in the discharged-air thermosensor 49 in the evaporator 9. Accordingly, there arises an effect in that room cooling can be made though some failure occurs in the sensor 49.

Thermoregulation in the thermoregulating section 1 except the compressor 10 (Step 106) and control for the compressor 10 (Step 107) are carried out on the basis of the calculated value. Thereafter, the situation of the routine is returned to the step 101 to repeat the execution of the control routine in the same manner as described above.

In the following, the thermoregulation (Step 106) and the compressor control (Step 107) are described in detail with reference to the flow charts of FIGS. 4 and 5.

Figure 4:
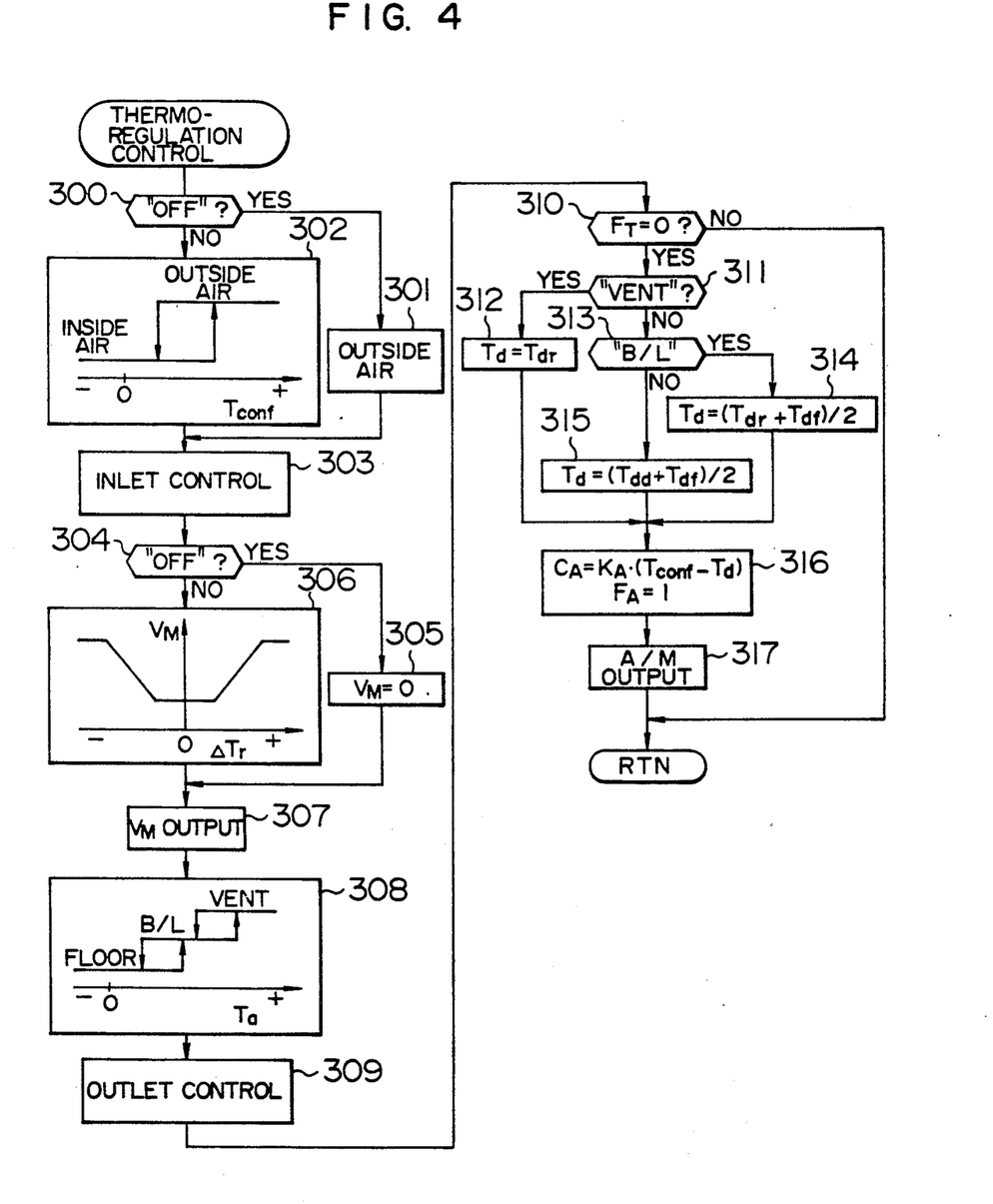
Figure 5:
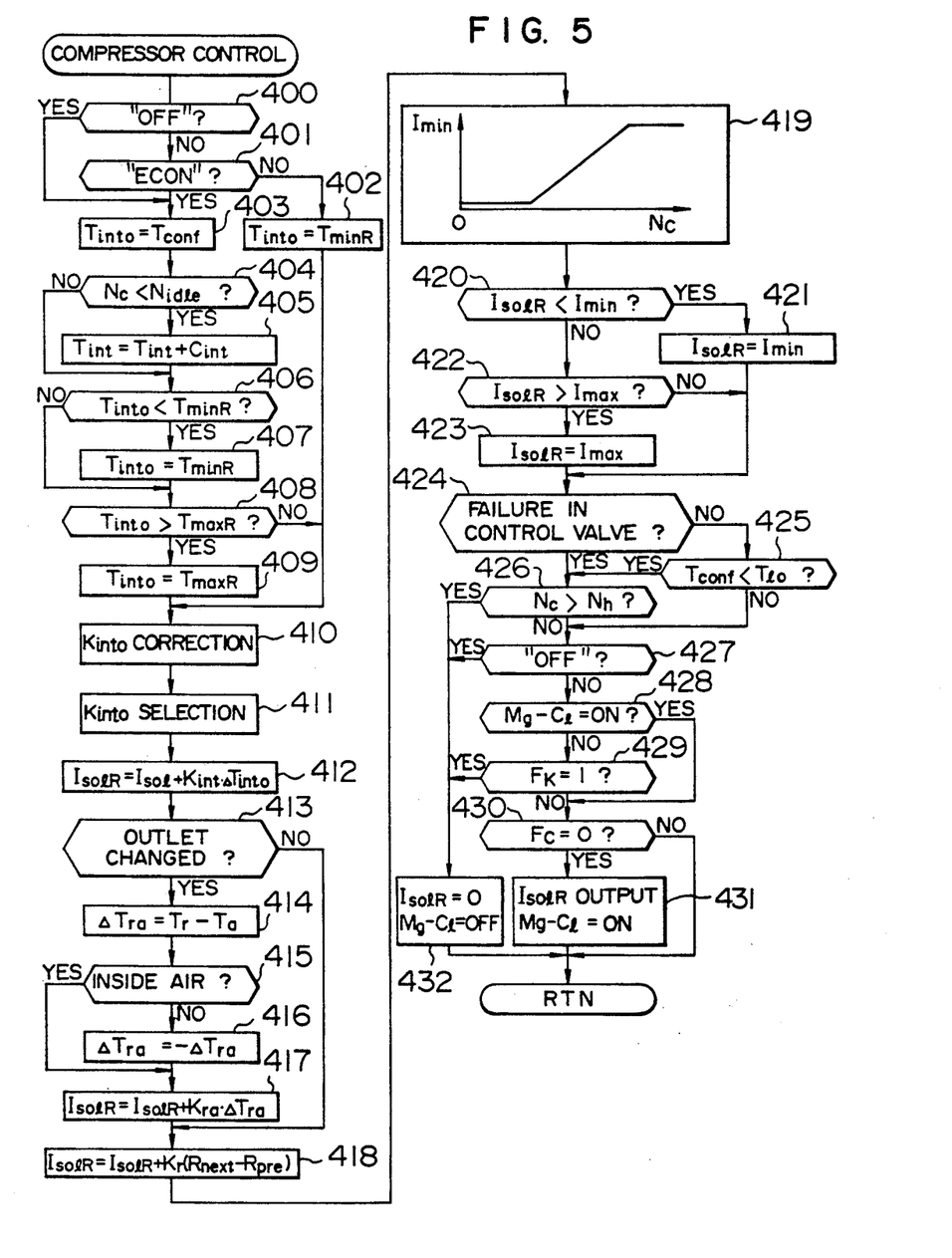

In the thermoregulation (Step 106) in FIG. 4, the respective openings of the intake door 8, the air mixing door 14, the defroster door 16 and the vent door 17 and the revolution speed of the fan 5 are controlled mainly.

First, a judgment (step 300) is made as to whether the "OFF" switch is in an ON state. When the switch is in the ON state, the intake door 8 is opened to introduce outside air (Step 301). When the switch is not in the ON state, on the contrary, the opening of the intake door 8 is determined correspondingly to the necessary blowout temperature $T_{conf}$ to thereby adjust the quantities of suction inside air and suction outside air to the characteristics as shown in FIG. 4 (Step 302). An instruction value based on the values of the air intakes is given to the door driving circuit 31 to control the door opening (Step 303).

A judgment (Step 304) is made again as to whether the "OFF" switch 24 is in an ON state. When the switch is in the ON state, the voltage $V_M$ applied to the motor 4 is set to 0 V in order not to rotate the fan 5 (Step 305). When the switch is not in the ON state, on the contrary, the voltage $V_M$ applied to the motor 4 is set to have the characteristic as shown in FIG. 4 on the basis of the deviation $\Delta T_r$ of the inside air temperature from the set temperature, calculated by the equation (1) (Step 306). Then, an instruction value is given to the constant-voltage driving circuit 34 to obtain the set voltage $V_M$ to thereby control the revolution speed of the motor 4 and control the rotation speed of the fan 5 (Step 307).

Then, the respective openings of the defroster door 16 and the vent door 17 are set to have the characteristics as shown in FIG. 4 correspondingly to the vent, bi-level, floor modes, on the basis of the outside air temperature $T_a$ detected by the outside air thermosensor 44 (Step 308). An instruction value is given to the door driving circuit 33 to control the respective openings of the defroster door 16 and the vent door 17 (Step 309).

In the next step 310, a judgment is made as to whether a predetermined time has passed in the TIMER routine, that is, as to whether the flag $F_T$ to be reset to "0" with the passage of a predetermined time is "0". When the flag $F_T$ is "1", the thermoregulating routine is terminated because the predetermined time is not yet passed. When the flag $F_T$ is "0", on the contrary, the flag $F_T$ is set to "1" and then judgments are made as to whether the mode is a vent mode (Step 311) and as to whether the mode is a bi-level mode or a floor mode (Step 313). When the mode is a vent mode, the duct temperature $T_d$ is set to be equal to the vent duct temperature $T_{dv}$ (Step 312). When the mode is a bi-level mode, the duct temperature $T_d$ is set to be equal to the average of the vent duct temperature $T_{dv}$ and the floor duct temperature $T_{df}$ (Step 314). When the mode is a floor mode the duct temperature $T_d$ is set to be equal to the average of the defroster duct temperature $T_{dd}$ and the floor duct temperature $T_{df}$ (Step 315).

Thereafter, the product $C_A$ of the difference between $T_{conf}$ and $T_d$ calculated as described above and the coefficient $K_A$ is calculated, and, at the same time, the flag $F_A$ for indicating that measurement of the time of energizing the door driving circuit 32 is in progress is set to "1" (Step 316). Then, the air mixing door 14 is turned to approach $C_A$ to "0" (Step 317).

In the following, the compressor control routine (107) is described in detail with reference to the flow chart of FIG. 5.

First, a judgment is made as to whether the "OFF" switch 24 is in an ON state (Step 400). When the "OFF" switch is in an OFF state, that is, when the air conditioner is operated, a judgment is further made as to whether the "ECON" switch is in an ON state (Step 401). When the "ECON" switch is in an OFF state, the "AUTO" switch is in an ON state. In this case, the target discharged-air temperature $T_{intO}$ of the evaporator 9 is set to a limit temperature $T_{minR}$ (in this embodiment, 3° C.) at which the evaporator 9 is frozen. Then, the situation of the routine is skip to the step 410.

Figure 6:
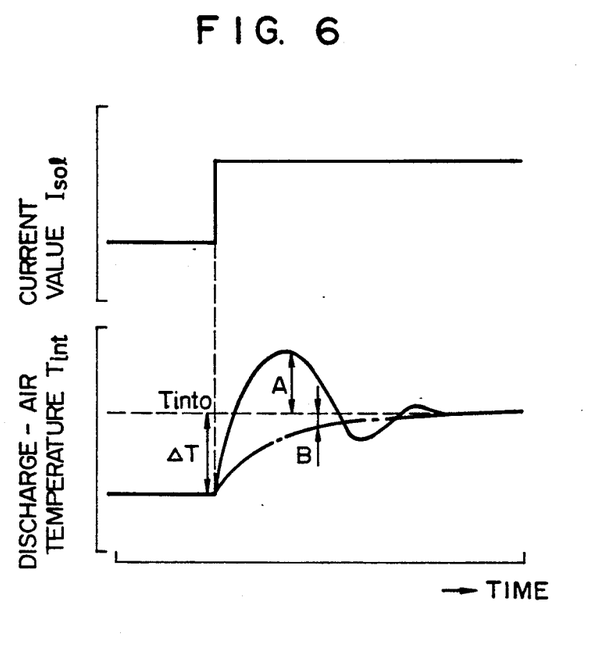
FIG. 6 is a graph view showing the change of the air-discharge temperature $T_{int}$ as the result of an operation in FIG. 1.

When the air-conditioner is not operated or when the "ECON" switch is in the ON state, on the contrary, the temperature $T_{intO}$ is set to be equal to $T_{conf}$ to thereby control the cooling power to obtain a comfortable temperature (Step 403). Then, a judgment is made as to whether the revolution speed $N_c$ is lower than the idling revolution speed $N_{idle}$, that is, as to whether the engine is in an idling state (Step 404). When the engine is in the idling state, the load of the compressor 10 on the engine is lightened by increasing $T_{intO}$ by a constant $C_{Ant}$ (in this embodiment, 2 deg) (Step 405). A judgment is made as to whether $T_{intO}$ is lower than the limit temperature $T_{minR}$ (Step 406). When the $T_{intO}$ is lower than $T_{minR}$, the value of $T_{intO}$ is replaced by $T_{minR}$ to prevent the freezing of the evaporator 9 (Step 407). A judgment is further made as to whether $T_{intO}$ is higher than the upper limit $T_{maxR}$ (in this embodiment, 15° C.) of the practical discharged-air temperature (Step 408). When $T_{intO}$ is higher than $T_{maxR}$, $T_{intO}$ is replaced by $T_{maxR}$ (Step 409). Only in the case where the failure diagnosis (104) decides that there is no failure, the coefficient $K_{int}$ determined correspondingly to the target discharged-air temperature $T_{intO}$, the engine revolution speed $N_c$ and the outside air temperature $T_a$ is corrected (Step 410). In short, the coefficient $K_{int}$ stored in the RAM of the micro computer 21 is corrected to control the discharged-air temperature $T_{int}$ stably to be approached to the target discharged-air temperature $T_{intO}$. The correction is carried out as follows. As shown in FIG. 6, the coefficient $K_{int}$ is reduced proportionally to the overshooting rate (A/ΔT) is the change of $T_{int}$ beyond $T_{intO}$. Further, the coefficient $K_{int}$ is increased proportionally to the transit rate (B/ΔT) of $T_{intO}$ to $T_{int}$ when the change of $T_{int}$ is lower than a predetermined value. The correcting procedure is carried out at the point A or at the point B in FIG. 6.

The optimum value of the coefficient $K_{int}$ can be selected correspondingly to the cooler cycle state. In short, the coefficient $K_{int}$ stored in the RAM of the micro computer 21 is selected (Step 411).

Then, the target current value $I_{solR}$ in the control valve 11 determining the inclination angle of the inclined plate of the compressor 10 is defined, on the basis $$I_{sol} \quad T_{in}$$

of the current value $I_{sol}$ and the difference $\Delta T_{into}$ ($= T_{intO} - T_{int}$) between the target discharged-air temperature $T_{intO}$ and the discharged-air temperature $T_{int}$, by the following equation (Step 412).

$$I_{solR} = I_{sol} + K_{int} T_{intO} \cdots \quad (3)$$

The target current value $I_{solR}$ for controlling the inclination angle of the inclined plate is defined as described above. However, in the case where the air intake control and the transmission gear ratio $R_{pre}$ having an influence on the discharged-air temperature $T_{int}$ are changed, the following correction is carried out to reduce the influence on the discharged-air temperature.

From the comparison with data stored in the RAM of the micro computer 21, a judgment (Step 413) is made as to whether some change arises in the air intake control (Step 303). When some change arises, the temperature difference $\Delta T_{ra}$ is calculated on the basis of the inside air temperature $T_r$ and the outside air temperature $T_a$ (Step 414).

$$\Delta T_{ra} = T_r - T_a \quad (4)$$

Then, a judgment is made as to whether the inside air intake is selected (Step 415). When the outside air intake is selected, the difference $\Delta T_{ra}$ is replaced as follows (Step 416).

$$\Delta T_{ra} = -\Delta T_{ra}$$

Further, the target current value $I_{solR}$ is corrected by using the coefficient $K_{ra}$ as represented by the following equation (Step 417).

$$I_{solR} = I_{solR} + K_{ra} \cdot T_{ra} \quad (5)$$

When the gear ratio $R_{pre}$ is changed, the target current value $I_{solR}$ is corrected by a value obtained by multiplying the difference between the gear ratio $R_{pre}$ and the next gear ratio $R_{next}$ by the coefficient $K_r$ as represented by the following equation (Step 418).

$$I_{solR} = I_{solR} + K_r (R_{next} - R_{pre}) \quad (6)$$

The change of the discharged-air temperature $T_{int}$ reduced on the basis of the aforementioned correction because the influence on the change of the state of the car is predicted.

In short, the change of the air temperature in the downstream side of the evaporator is predicted on the basis of information of the air conditioner and information received from the engine controller, so that the quantity of compressor capacity control is corrected while the influence of disturbance is considered. Accordingly, an effect arises in that the temperature of blowout air can be kept comfortable. Further, the optimum value of the air temperature control in the downstream side of the evaporator can be selected correspondingly to the cooler cycle circumstances such as outside temperature. Further, the aforementioned constant can be optimized by the control effect. Accordingly, an effect arises in that the downstream air temperature can be stably controlled to the target value with no occurrence of hunting.

The capacity of the compressor 10 is determined by the current value $I_{sol}$. As the current value decreases, the capacity of the compressor 10 increases. When high-rotational driving is continued in this condition, the compressor 10 may be damaged due to the unbalance of the rotating body. Therefore, it is necessary to establish the minimum current value $I_{min}$. In short, the minimum current $I_{min}$ allowed to be passed through the control valve 11 is determined by the characteristic in FIG. 5 so that the minimum current $I_{min}$ increases as the engine rev number $N_c$ increases (Step 419).

Then, a judgment is made as to whether the target current value $I_{sol}$ is lower than $I_{min}$ (Step 420). When $I_{sol}$ is lower than $I_{min}$, the value is depressed to the lower limit (Step 421). Further, a judgment is made as to whether the target current value $I_{solR}$ is higher than the allowable upper limit $I_{max}$ (in this embodiment, 1 A) (Step 422). When $I_{solR}$ is higher than $I_{max}$, the value is depressed to the upper limit (Step 423).

By the aforementioned technique, the injury of the compressor caused by continuous high-speed rotation of the compressor of a large capacity can be prevented.

After the current is set to the target current value as mentioned above, the control valve 11 is diagnosed as to whether it is in a failure or not (Step 424). Specifically, it is judged whether the output current of the constant current driving circuit 25 is different from the designated current or not, that is, whether a coil or harness of the control valve 11 is broken or the target current value $I_{solR}$ generated by the following procedure and the ON/OFF state of the magnet clutch are decided. When there is no failure, a judgment is made as to whether $T_{conf}$ can be set to be smaller than a value $T_{10}$ (in this embodiment, 0° C.) corresponding to a large heat load, that is, as to whether the capacity of the compressor 10 can be increased (Step 425). When the capacity can be increased or when the failure of the control valve is judged, a judgment is made as to whether the engine revolution speed $N_c$ is larger than a predetermined value $N_h$ (in this embodiment, 4000 rpm) (Step 426). When $N_c$ is larger than $N_h$, the situation of the procedure is skipped to the step 432. In this case, the capacity of the compressor may be fixed to a set value to attain a good cooling operation as in a capacity-fixed type compressor.

When there is no high-speed rotation, that is, when a judgment is made that the compressor will be not injured, a judgment is made again as to whether the "OFF" switch is in an ON state (Step 427). When the air conditioner is not operative, the situation of the procedure is skipped to the step 432. When the air conditioner is operative, on the contrary, a judgment is made as to whether the magnet clutch 13 is in an ON state (Step 428). When the clutch is not in the ON state, a judgment is made as to whether the flag $F_K$ for limiting the switching-on of the magnet clutch is "1" (Step 429). When the flag $F_K$ is "1", the situation of the procedure is shifted to the step 427. When the magnet clutch is in the ON state or when the flag $F_K$ is "0", on the contrary, a judgment is made as to whether the flag $F_C$ for permitting the change of the output current in the control valve 11 is "0" (Step 430). When the flag $F_C$ is "0", an instruction is given to the constant-current driving circuit 25 that the current $I_{solR}$ calculated as described above should be regarded as the target current, and, at the same time, an instruction is written in the RAM that the magnet clutch should be switched on (Step 431). When the flag $F_c$ is "1", on the contrary, the procedure is terminated.

On the other hand, in the step 432, an instruction is given to the constant-current driving circuit 25 that the current of 0A should be regarded as the target current, and, at the same time, an instruction is written in the RAM that the magnet clutch should be switched off.

In the aforementioned configuration, the compressor 10 is stopped only when both failure of the control valve and high-speed rotation occur. In short, the compressor can be operated with no injury regardless of the high-speed rotation and the failure of the control valve 11 so long as the two factors do not occur simultaneously. Accordingly, an effect arises in that the cooling operation can be carried out continuously. When the compressor revolution speed signal is abnormal, the compressor 10 can be operated to make the cooling operation possible if there is no necessity of protecting the compressor because of the high-speed rotation thereof. Further, an advantage is provided in that damage can be prevented by stopping the compressor 10 in the case where the heat load of the evaporator is large and the output of the compressor 10 is not reduced even when at high speed rotation.

Further, an effect arises in that the performance of the compressor can be backed up by the remaining normal devices to thereby keep the performance as in the capacity-fixed type compressor.

Figure 7:
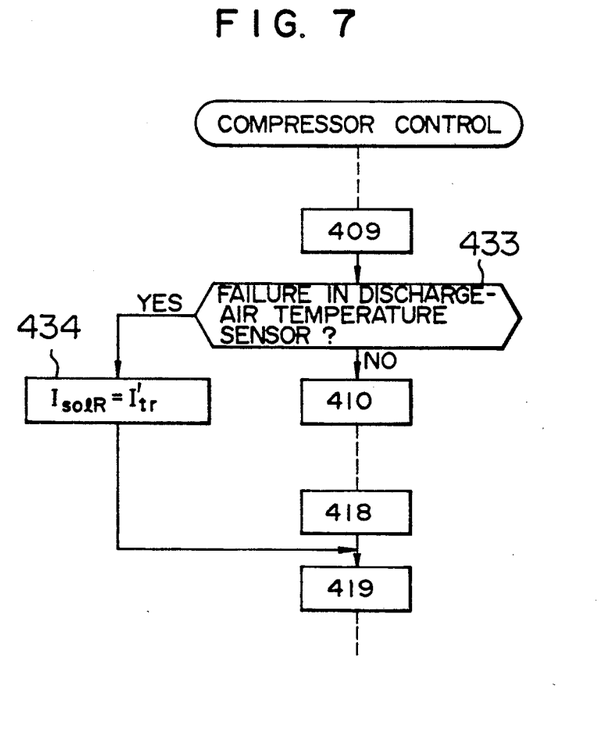
FIG. 7 is a flow chart of a program showing another embodiment of the present invention.

FIG. 7 is a control flow chart showing a compressor control procedure in another embodiment of the present invention. In FIG. 7, items which are the same as that in FIG. 5 are referenced correspondingly at the only part that is different from FIG. 5 is illustrated. A judgement is made as to whether the occurrence of a failure in the discharged-air thermosensor 49 is provided in the failure diagnosis (Step 104) or not (Step 433). When some failure is judged, the target current value $I_{solR}$ is replaced by a predetermined current value $I_{trX}$ in which the refrigerant evaporating pressure in the evaporator 9 reaches a freezing limit value (in this embodiment, 2.0 kg/cm²Go) (Step 434).

According to this embodiment, the compressor 10 can be operated to keep the cooling operation while the freezing of the evaporator 9 is prevented, even if some failure occurs in the discharged-air thermosensor 49.

According to the present invention, the stopping of the compressor can be prevented when a judgment is made that some failure occurs singly in the variable capacity mechanism of the compressor, the engine revolution speed signal, and the like. Accordingly, an effect arises in that the cooling operation can be carried out while the injury of the compressor is prevented.

According to the present invention, the freezing of the evaporator can be prevented and at the same time the downstream air temperature can be controlled to a target value even in the case where some failure occurs in input signals, because the input signals are replaced by set values. Further, the refrigerant evaporating pressure can be kept higher than the freezing limit value even though some failure occurs in the air thermosensor provided in the downstream side of the evaporator. Accordingly, an effect arises in that the freezing of the evaporator can be prevented.

According to the present invention, the capacity of the compressor is controlled on the basis of the optimum constant of the cooler cycle correspondingly to the target value of the evaporator downstream air temperature, the engine revolution speed and the outside air temperature. Accordingly, the capacity of the compressor can be controlled stably to a target value, so that blowout air having a comfortable temperature can be obtained. Further, constants are corrected on the basis of the difference between the measured value and the target value of the downstream air temperature and the change of the suction air as well as the change of the gear ratio in the transmission are considered, so that the capacity control rate can be corrected before the evaporator downstream air temperature is changed temporarily. Accordingly, an effect arises that the change of the downstream temperature can be prevented and, accordingly, blowout air having a comfortable temperature can be kept.

What is claimed:

1. A car air conditioner comprising a refrigerator including a variable-capacity compressor having a variable capacity mechanism mounted thereon, a control circuit section for controlling an operation of said compressor, and an engine controller for controlling an engine for driving said compressor, said control circuit section including means for judging whether or not said compressor is to be stopped on the basis of at least two of detection signals of said refrigerator, said engine and said engine controller, and means for controlling a capacity of said variable-capacity compressor to fix to a set valve when one of said at least two of said detection signals is judged as being abnormal.

2. A car air conditioner according to claim 1, in which one of said detection signals is a signal which is generated when the revolution speed of said engine is higher than a predetermined value.

3. A car air conditioner comprising a refrigerator having a variable-capacity compressor mounted thereon, a control circuit section for controlling an operation of said compressor, an engine for driving said compressor, and a thermoregulator for sending conditioned air into a car room, in which said control circuit section performs at least one of control operations to stop said compressor and to fix a capacity of said compressor to a set value when a detected revolution speed of said engine is judged to be more than a predetermined value and a heat load in said car room is judged to exceed a range of the variable capacity of said compressor.

4. A car air conditioner according to claim 3, in which when the detected revolution speed of said engine is judged to exhibit an abnormal value, the abnormal value is regarded as the maximum revolution speed of said engine.

5. A car air conditioner comprising a refrigerator having a variable-capacity compressor mounted thereon, a thermoregulator for sending conditioned air into a car room, an engine controller for controlling an engine for driving said compressor, sensors provided in said engine, said refrigerator, said thermoregulator, and said engine controller, and a control circuit section connected to said sensors, said refrigerator, said thermoregulator, and said engine controller connected through communication lines to control said refrigerator and said thermoregulator, in which said refrigerator and said thermoregulator are controlled to keep said car room in a predetermined air-conditioning state by replacing a plurality of set values stored in said control circuit section with predetermined set values when an input signal given to said control circuit section is judged to be abnormal.

6. A car air conditioner according to claim 5, in which when a detection signal of an air thermosensor in a downstream of an evaporator constituting said refrigerator is judged to be abnormal, the amount of refrigerant discharge in said variable-capacity compressor is regarded as a limit value at which said evaporator is frozen.

7. A car air conditioner comprising a refrigerator having a variable-capacity compressor mounted thereon and provided with a variable capacity mechanism to make a capacity of said compressor variable, a thermoregulator for sending conditioned air into a car room within which an evaporator of said refrigerator is provided, an engine for driving said compressor, a thermosensor provided in said evaporator, and a control circuit section for receiving a signal from said thermosensor and for controlling said variable capacity mechanism on the basis of the signal received from said thermosensor, in which when the signal of said thermosensor is judged as being not abnormal, a value of control for said variable capacity mechanism of said variable-capacity compressor is corrected on the basis of a control coefficient and a difference between a target value of an air-discharge temperature of said evaporator calculated by said control circuit section and a measured value of the air-discharge temperature detected by said thermosensor.

8. A car air conditioner according to claim 7, in which said control value is limited at the high revolution speed side of said engine to reduce the capacity of said compressor.

9. A car air conditioner according to claim 7, in which said control coefficient is corrected on the basis of the target value of the air-discharge temperature of said evaporator, the revolution speed of said engine, and the temperature of outside air.

10. A car air conditioner according to claim 9, in which said control value is limited at the high revolution speed side of said engine to reduce the capacity of said compressor.

11. A car air conditioner comprising a refrigerator having a variable-capacity compressor mounted thereon and provided with a variable capacity mechanism to make a capacity of said compressor variable, a control section of said refrigerator, an engine controller for controlling an engine for driving said compressor, a thermoregulator for sending conditioned air into a car room, sensors provided in said refrigerator, said engine controller and said thermoregulator, and a control circuit section for receiving signals from said sensors and for controlling said variable capacity mechanism on the basis of the signals received from said sensors, in which a value of control for said variable capacity mechanism is corrected by predicting a change in an operating condition of said refrigerator and on the basis of information possessed by said control section and information received by said engine controller.

12. A car air conditioner according to claim 11, in which the information possessed by the control section of said refrigerator represents a difference between a temperature of inside air and a temperature of outside air of said thermoregulator.

13. A car air conditioner according to claim 12, in which the information received from said engine controller represents a difference in gear ratio of a transmission.

14. A car air conditioner according to claim 11, in which the information received from said engine controller represents a difference in gear ratio of a transmission.

15. A car air conditioner according to claim 14, in which said control value is limited at the high revolution speed side of said engine to reduce the capacity of said compressor.

16. A car air conditioner according to claim 11, in which said control value is limited at the high revolution speed side of said engine to reduce the capacity of said compressor.

17. A car air conditioner according to claim 12, in which said control value is limited at the high revolution speed side of said engine to reduce the capacity of said compressor.

* * * * *